United States Patent [19]

Kami et al.

[11] Patent Number: 4,583,759
[45] Date of Patent: Apr. 22, 1986

[54] UPPER SUSPENSION ARM SUPPORT STRUCTURE

[75] Inventors: Yozo Kami, Saitama; Masaaki Minakawa; Kanji Kubo, both of Tokyo, all of Japan

[73] Assignee: Honda Giken Kogyo Kabushiki Kaisha, Tokyo, Japan

[21] Appl. No.: 551,296

[22] Filed: Nov. 14, 1983

[30] Foreign Application Priority Data

Nov. 24, 1982 [JP] Japan ................................. 57-206660

[51] Int. Cl.⁴ ............................................... B60G 3/00
[52] U.S. Cl. .................................... 280/673; 280/96.1
[58] Field of Search ............... 280/613, 672, 673, 701, 280/711, 96.1, 663

[56] References Cited

U.S. PATENT DOCUMENTS

| | | | |
|---|---|---|---|
| 2,862,741 | 12/1958 | Baker .................................. | 280/96.1 |
| 3,510,148 | 5/1970 | Wilfert ................................ | 280/673 |
| 3,551,990 | 1/1971 | Wehner ............................... | 280/673 |
| 4,097,057 | 6/1978 | Goodrich et al. ................... | 280/96.1 |
| 4,159,125 | 6/1979 | Buchwald ........................... | 280/673 |
| 4,327,927 | 5/1982 | Tanaka et al. ....................... | 280/673 |
| 4,480,852 | 11/1964 | Rumpel ............................... | 280/673 |

FOREIGN PATENT DOCUMENTS 1111039 7/1961 Fed. Rep. of Germany ...... 286/673

Primary Examiner—Richard A. Bertsch
Attorney, Agent, or Firm—Lyon & Lyon

[57] ABSTRACT

A suspension arm supporting structure for overhead attachment of an upper suspension control arm to the vehicle body using a pair of bolts, each with a large head protruding downwardly towards the wheel, a hole in each head aligned along the same horizontal axis, and a horizontal bolt extending between the two holes in the heads of the vertical bolts to pivotally connect an upper suspension control arm to the vehicle body.

7 Claims, 5 Drawing Figures

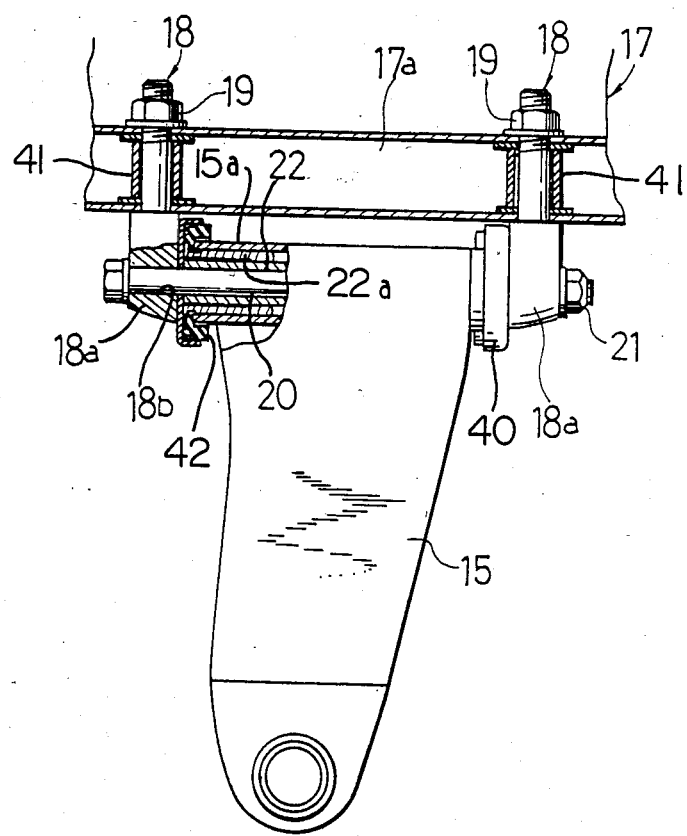

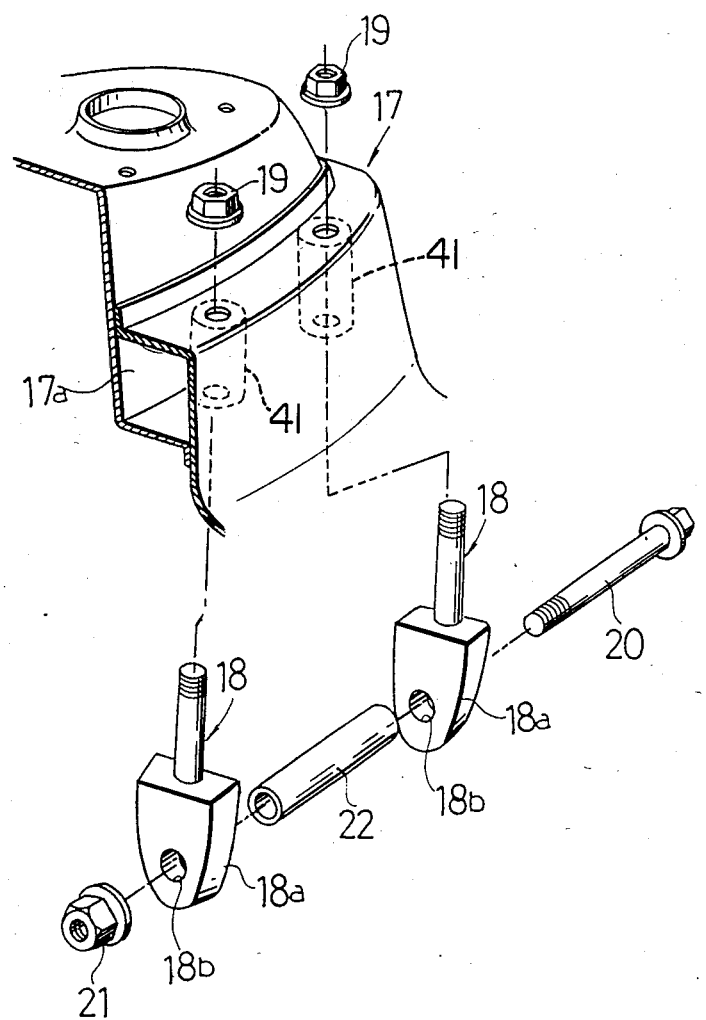

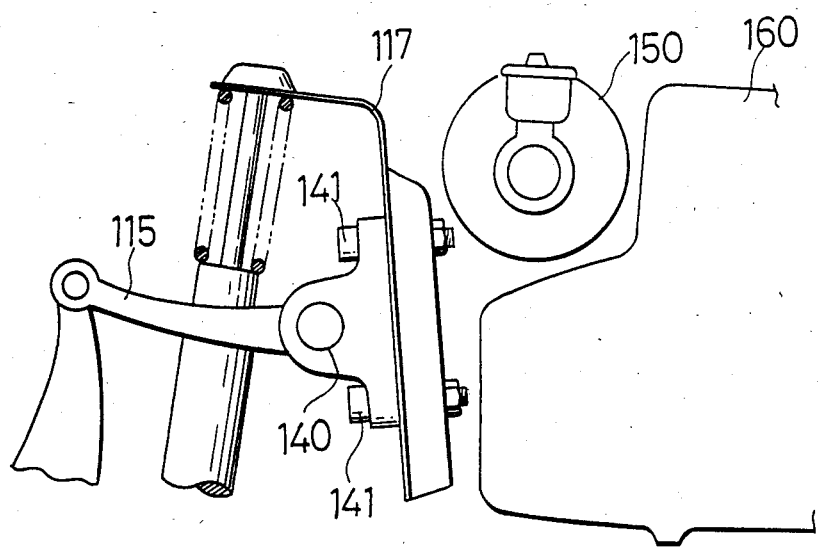

UPPER SUSPENSION ARM SUPPORT STRUCTURE

This invention relates to an improvement in the structure used to pivotally mount a suspension arm to the vehicle body, and in particular, to a means to pivotally mount an upper suspension system control arm in such a way as to greatly increase the ease with which the structure may be disconnected from the vehicle body. A typical conventional suspension arm is mounted directly onto the vehicle body frame using bearing means as shown in FIG. 5. Such a system creates problems whenever the pivoting arms need to be disconnected from the vehicle because the bolts or the nuts project inward toward the engine cavity where the room between the engine and other internal components is extremely limited.

This invention has been designed to solve such problems. As the enclosed drawings show, the object of this invention is to provide a suspension arm support structure for a vehicle which is reliable, simple to assemble, and easy to connect or disconnect from the vehicle body. The preferred embodiment of this invention is designed to attach to a box-like member of a vehicle body using a pair of vertical bolts, each with a large head, which are fixed to the box-like member of the vehicle body such that the heads are directed downwards. Holes are formed in these bolt heads such that a second bolt may extend between the holes in these first two bolt heads for pivotally connecting the upper suspension control arm to the vehicle body.

This arrangement enables the upper suspension control arm to be easily connected or disconnected from the vehicle body, as well as providing a simple, reliable base for pivotally mounting the control arm. While the preferred embodiment of the invention is described herein, it is not intended to limit the scope of uses or vehicle body types to which this pivoting support assembly may be utilized.

The preferred embodiment of the invention is described herein, referring to the drawings wherein:

FIG. 3 is a partially cross-sectional view of the supporting structure according to this invention;

FIG. 4 is an exploded perspective view of the supporting structure; and

FIG. 5 is a rear elevational view of a conventional supporting structure.

Figure 1:
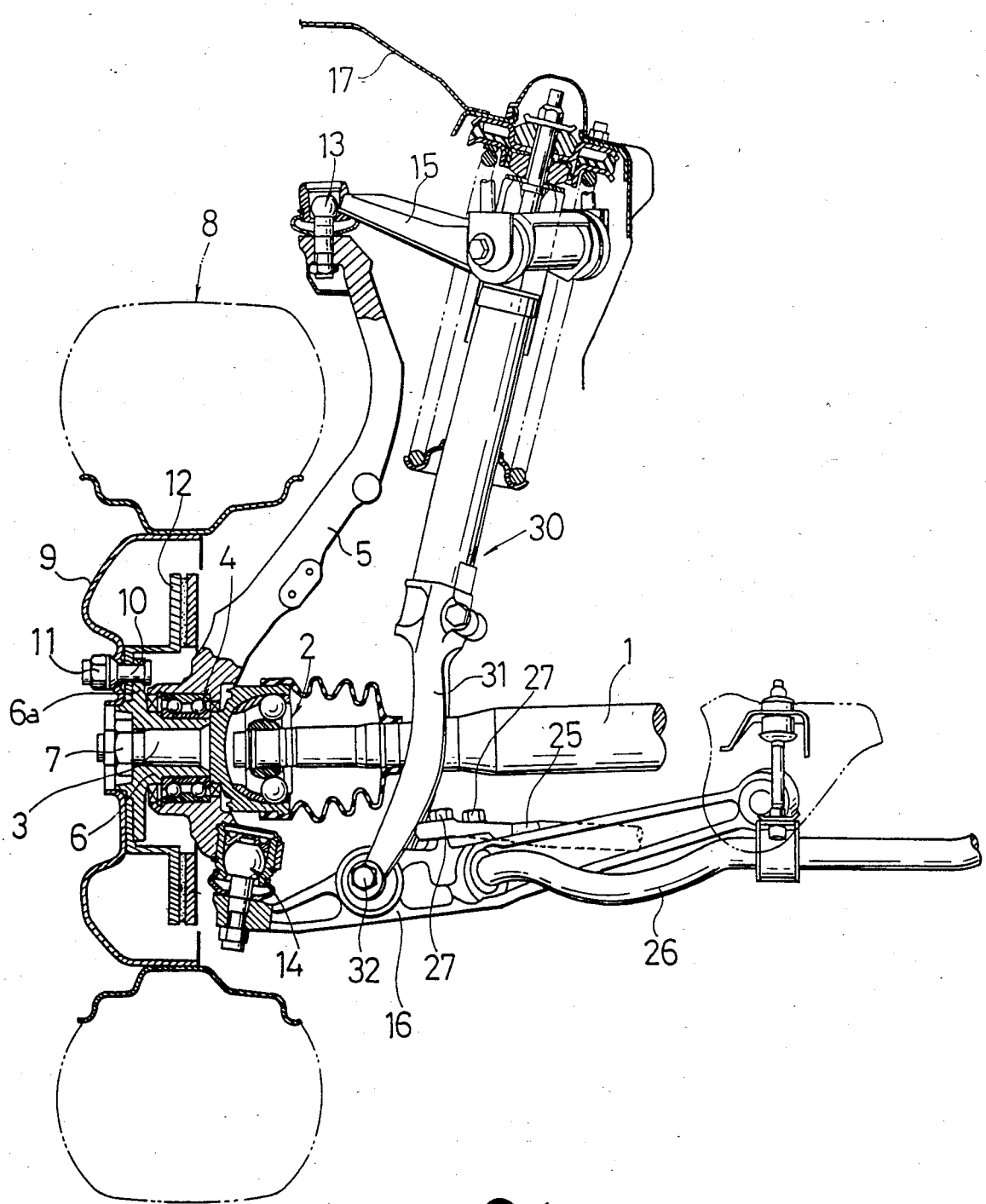
FIG. 1 is a partially cross-sectional rear elevational view of the suspension system.
Figure 2:
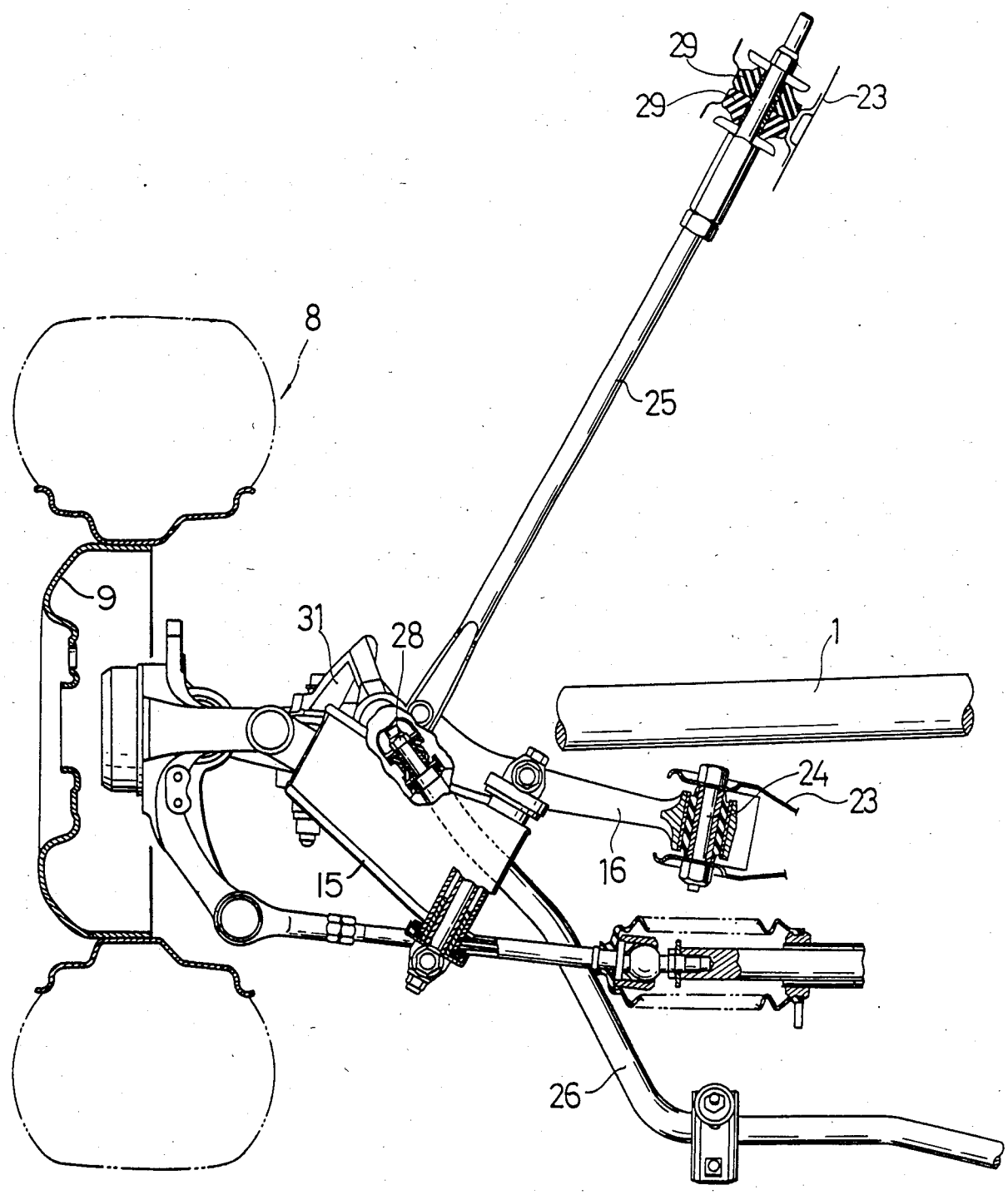
FIG. 2 is a plan view of the suspension system.

Referring to FIGS. 1 and 2, a suspension system for a front-wheel drive, transverse mounted engine arrangement will be described. The drive shaft 1 extends in the direction of the width of the vehicle body and is connected to an axle 3 via a uniform velocity universal joint 2. A hub 6, rotatably supported by a knuckle arm 5 via bearing means 4, is splined and fixed onto the axle 3 by a nut 7 threaded onto the end of the axle 3. The hub 6 has a flange 6a to which a wheel 9 is fastened by means of bolts 10 and nuts 11 so that a tire 8 can rotate about the axis of the axle. Mounted between the hub 6 and the wheel 9 is a brake disc 12.

The upper end of the knuckle arm 5 is connected to an upper control arm 15 by a ball joint 13. Similarly, the lower end of the knuckle arm 5 is connected to a lower control arm 16 through a ball joint 14. As shown in FIG. 2, the upper arm 15 is inclined rearwardly with respect to the vehicle body. The end of the upper arm 15 which is not connected to the knuckle arm 5 is pivotally connected to the vehicle body 17 as shown in FIGS. 3 and 4.

Two bolts 18, each with a large head 18a and a hole 18b formed in each head 18a, perpendicular to the longitudinal axis of the bolt 18, hereinafter called an eyebolt, are fastened to a box-like member 17a of the vehicle body 17 by means of nuts 19. The eyebolts 18 are fixed in such a way that the bolts are vertical and the heads 18a are directed downward. Cylindrical spacers 41 are used to maintain the integrity of the box-like member 17a of the vehicle body 17 by positioning the spacers between the top and bottom plates of the box-like member 17a with the eyebolts 18 extending through the spacers 41. Another bolt 20 extends horizontally through the holes 18b in the heads 18a of the two eyebolts 18.

The end of the upper arm 15 which is pivotally connected to the vehicle body 17 has a cylindrical housing 15a formed thereon. Within the cylindrical housing 15a of the upper arm 15 is a collar 22. Between the collar 22 and the inner wall of the cylindrical housing 15a is a bushing 22a which abuts against a seal member housing 40, which contains a seal 42. It should be noted that in FIG. 3 the arm 15 extends downwardly for clarity of illustration whereas in FIGS. 1 and 2 and in normal use the arm 15 extends more nearly horizontally.

The tubular shaft formed by the cylindrical housing 15a of the upper control arm 15 is aligned with the holes 18b in the heads 18a of the two eyebolts 18. The horizontal bolt 20 extends through the holes 18b of the two eyebolts 18 and the tubular shaft of the upper arm 15 and collar 22 assembly. The end of the horizontal bolt 20 is threaded and secured in place by a nut 21. Thus, the end of the upper arm 15 opposite the ball joint 13 is pivotally supported so that the end of the upper arm 15 which encompasses the ball joint 13 can move vertically.

The lower suspension arm 16 is pivotally supported to the vehicle body frame 23 with a bolt 24, so that the end of the lower arm 16 which encompasses the ball joint 14 can move vertically. Connected to the lower arm 16 at its middle point is a radius rod 25 and a stabilizer 26. The radius rod 25 extends forward from the lower arm 16 while the stabilizer 26 extends rearwardly from the lower arm 16. Both the radius rod 25 and the stabilizer arm 26 are inclined relative to the lower suspension arm 16.

A shock absorber 30 is mounted between the vehicle body and the lower arm 16. Since the upper arm 15 is located rearwardly relative to the shock absorber 30, there is no interference between the shock absorber 30 and the upper arm 15 positioned thereabove.

As shown in FIG. 5, the typical conventional means of support for an upper arm 115 uses bearing means 140 and is connected 141 directly to the vehicle body side wall 117. This severely limits access to the upper arm 115 due to internal vehicle components such as the engine 160 or the brake servo assembly 150. This problem is alleviated by the overhead mounting system disclosed herein.

This embodiment has been described with respect to the suspension system of only one wheel. It should be noted that the suspension system for the opposite wheel is identical. A driving force generated by the engine is transmitted to the drive shaft 1 and eventually to the wheel 9 through the universal joint 2, the axle 3, and the hub 6. When the wheel 9 vibrates up and down due to the roughness of the road while driving, the upper arm 15 and the lower arm 16 pivot about their connections to the vehicle body. The vertical motion is damped by the shock absorbed 30, so that the passengers of the vehicle are able to enjoy a good ride. The supporting structure of the upper arm 15 is simple and enables the upper arm to be connected or disconnected from the vehicle body easily and efficiently.

We claim:

1. A supporting structure to connect a pivoting arm to a vehicle body, comprising two bolt means mounted at spaced locations to connect said structure to the vehicle body, said bolt means being arranged such that neither bolt means is substantially aligned in the horizontal plane, each said bolt means having an integral head including a mounting means, said head protruding downwardly, and means to pivotally connect the pivoting arm to said mounting means of each said head.

2. The supporting structure of claim 1 wherein each said mounting means is a lateral hole through each said head aligned with the lateral hole in the other head, and a bolt extends through said lateral holes to support said pivoting arm.

3. The supporting structure as set forth in claim 1 wherein a collar is positioned between said head to maintain the relative position of each said heads.

4. The supporting structure as set forth in claim 3 wherein the vehicle body includes a substantially box-shaped portion and said supporting structure is mounted to the vehicle body by positioning at least one of said bolt means through said substantially box-shaped portion of the vehicle body.

5. A supporting structure to connect a pivoting arm to a box-like portion of a vehicle body with holes, comprising two bolts, said bolts being threaded at one end and having a head at the other end protruding downwardly, cylindrical spacers, each said spacer having a longitudinal hole, two of said spacers being placed inside the box-like portion of the vehicle body and aligned between the holes, means to connect said bolts to the vehicle body through said spacers and the holes, transverse holes formed in said downwardly protruding bolt heads, a cylindrical collar aligned between said transverse holes, a bolt running through said heads and collar and pivotally connecting the arm to said heads, and means to secure said bolt.

6. A support structure for a pivoting arm on a vehicle body, comprising, two bars, said bars having a head formed on one end, means to connect said bars to the vehicle body such that said heads protrude downwardly, holes formed in said bar heads, and means to pivotally connect the arm to said bar heads.

7. The pivoting arm support structure as set forth in claim 6 wherein the vehicle body is a box-like shape with an upper and lower face, holes being formed in the upper and lower faces of the vehicle body box-like shape, cylindrical spacers, said spacers with a hole along the longitudinal axis thereof, two said spacers being aligned with said holes in said faces within said box shape, said means to connect said bars to the vehicle body being used on the upper face of the said box-shape, and a cylindrical collar aligned with said holes in said bar heads to maintain the relative position thereof.

* * * * *